(12) United States Patent
Itou et al.

(10) Patent No.: US 9,659,223 B2
(45) Date of Patent: May 23, 2017

(54) DRIVING ASSISTANCE APPARATUS AND DRIVING ASSISTANCE METHOD

(71) Applicant: DENSO CORPORATION, Kariya, Aichi-pref. (JP)

(72) Inventors: Arata Itou, Nishio (JP); Muneaki Matsumoto, Okazaki (JP)

(73) Assignee: DENSO CORPORATION, Kariya (JP)

(*) Notice: Subject to any disclaimer, the term of this patent is extended or adjusted under 35 U.S.C. 154(b) by 145 days.

(21) Appl. No.: 14/432,321

(22) PCT Filed: Oct. 24, 2013

(86) PCT No.: PCT/JP2013/006296
§ 371 (c)(1),
(2) Date: Mar. 30, 2015

(87) PCT Pub. No.: WO2014/076888
PCT Pub. Date: May 22, 2014

(65) Prior Publication Data
US 2015/0286880 A1    Oct. 8, 2015

(30) Foreign Application Priority Data

Nov. 16, 2012  (JP) ................................. 2012-252042

(51) Int. Cl.
*G06K 9/00* (2006.01)
*B60K 1/04* (2006.01)
(Continued)

(52) U.S. Cl.
CPC ............ *G06K 9/00812* (2013.01); *B60K 1/04* (2013.01); *B60L 11/1829* (2013.01);
(Continued)

(58) Field of Classification Search
None
See application file for complete search history.

(56) References Cited

U.S. PATENT DOCUMENTS

| 2002/0149673 A1* | 10/2002 | Hirama ................... B60R 1/00 348/118 |
| 2009/0140881 A1* | 6/2009 | Sakai ..................... G08G 1/164 340/901 |
| 2011/0148350 A1* | 6/2011 | Wegener ............... B60L 11/182 320/108 |

FOREIGN PATENT DOCUMENTS

| JP | 2003-134507 A | 5/2003 |
| JP | 2003-212041 A | 7/2003 |

(Continued)

OTHER PUBLICATIONS

International Search Report and Written Opinion of the International Searching Authority mailed Feb. 4, 2014 in the corresponding PCT application No. PCT/JP2013/006296 (and English translation).

*Primary Examiner* — Sath V Perungavoor
*Assistant Examiner* — Janese Duley
(74) *Attorney, Agent, or Firm* — Posz Law Group, PLC

(57) ABSTRACT

A driving assistance apparatus captures with a camera a video image showing an area, which surrounds a vehicle and includes a target on a road surface; generates a positioning video image for positioning the vehicle; and displays the generated positioning video image on a display monitor. The driving assistance apparatus also acquires a relative location of the target with respect to the vehicle. Further, based on the relative location of the target, the driving assistance apparatus switches the display mode of the positioning video image displayed on the display monitor between a first display mode (in which the target moves with respect to the vehicle) and a second display mode (in which the vehicle moves with respect to the target).

8 Claims, 15 Drawing Sheets

(51) Int. Cl.
    *B60R 1/00* (2006.01)
    *B60L 11/18* (2006.01)
    *B60K 1/00* (2006.01)

(52) U.S. Cl.
    CPC ............ *B60L 11/1835* (2013.01); *B60R 1/00* (2013.01); *B60K 1/00* (2013.01); *B60L 2250/16* (2013.01); *B60R 2300/605* (2013.01); *B60R 2300/607* (2013.01); *B60R 2300/802* (2013.01); *B60R 2300/806* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

FOREIGN PATENT DOCUMENTS

| | | |
|---|---|---|
| JP | 2005-212660 A | 8/2005 |
| JP | 2006-238131 A | 9/2006 |
| JP | 2010-234878 A | 10/2010 |
| JP | 4905571 B2 | 3/2012 |
| JP | 2012-175764 A | 9/2012 |
| JP | 2012-210008 A | 10/2012 |

\* cited by examiner

FIG. 9
(a)
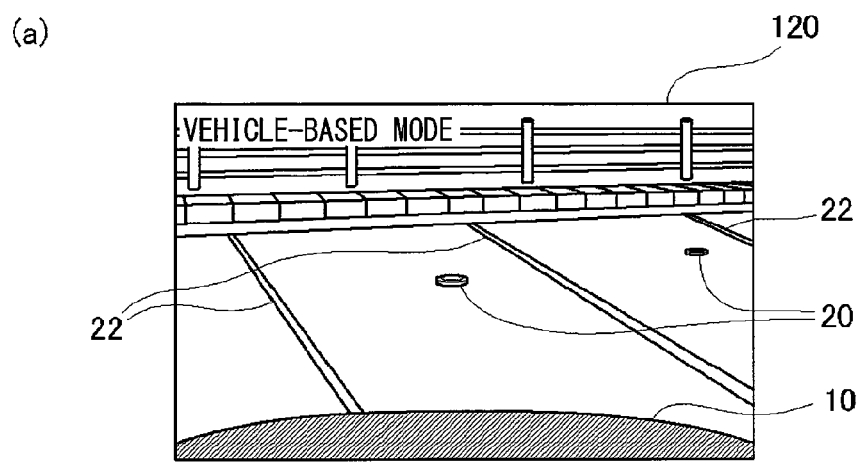
(b)
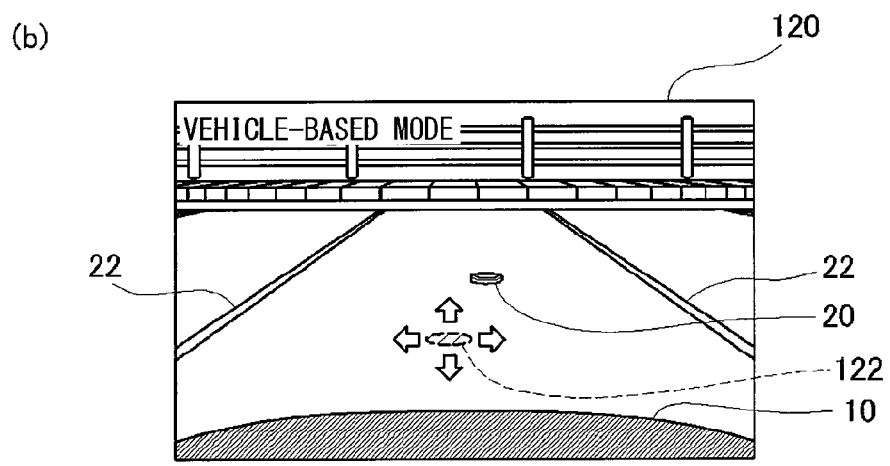

FIG. 11
(a)
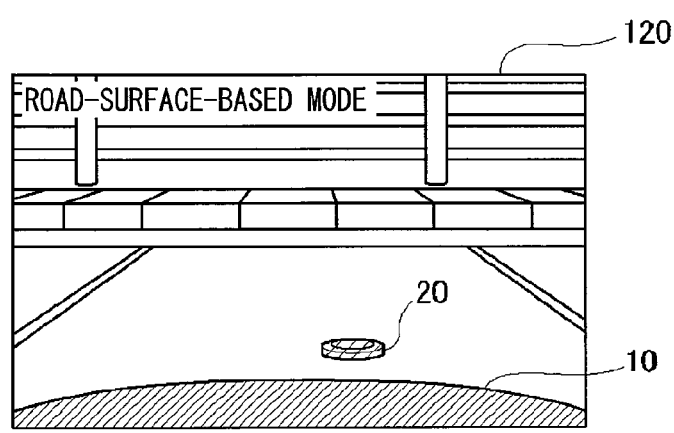
(b)
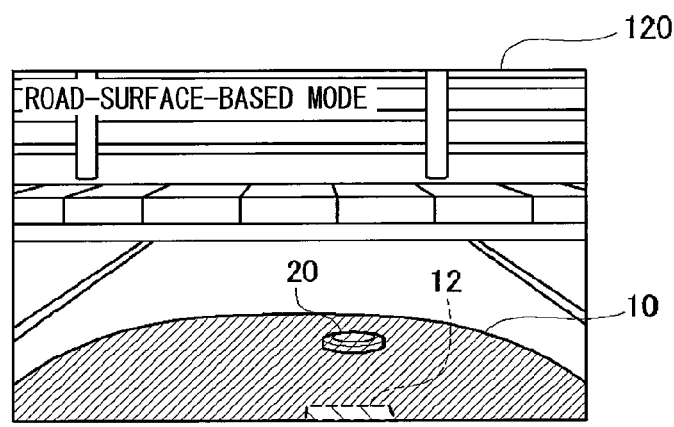
(c)
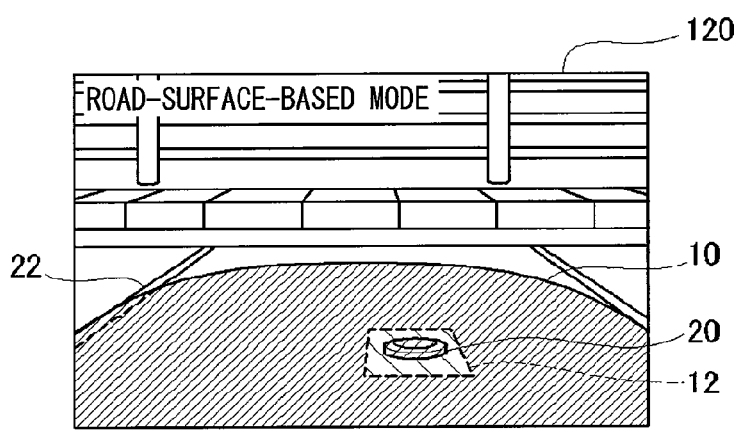

FIG. 14
(a)
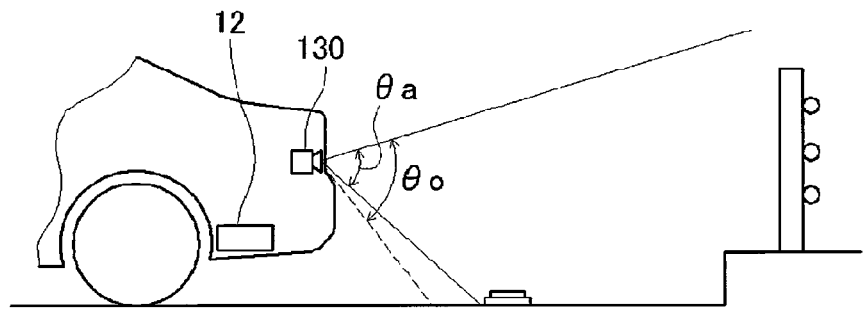
(b)
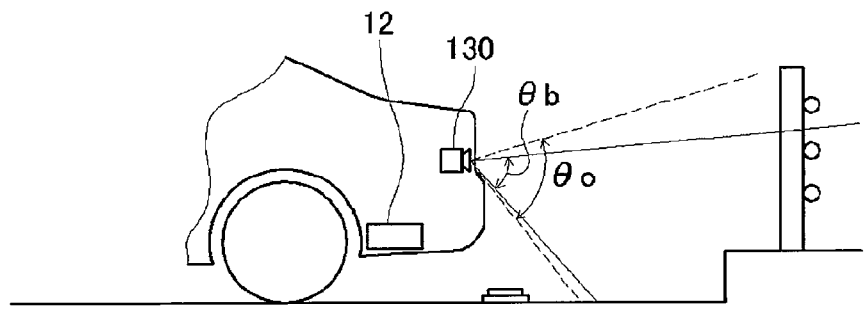
(c)
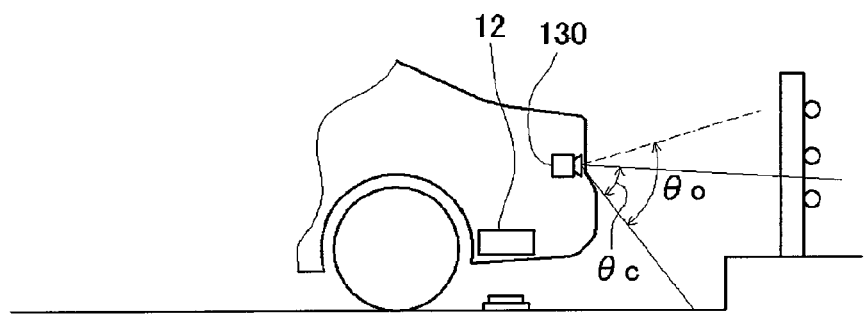

DRIVING ASSISTANCE APPARATUS AND DRIVING ASSISTANCE METHOD

CROSS REFERENCE TO RELATED APPLICATIONS

The present disclosure is a U.S. national stage application of PCT/JP2013/006296 filed on Oct. 24, 2013 and is based on Japanese Patent Application No. 2012-252042 filed on Nov. 16, 2012, the disclosures of which are incorporated herein by reference.

TECHNICAL FIELD

The present disclosure relates to a technology that assists a driver of a vehicle in positioning the vehicle with respect to a target on a road surface and stopping the vehicle.

BACKGROUND ART

When a vehicle is driven by its driver, the driver sometimes has to stop the vehicle after positioning it with respect to a certain target. In a parking lot, for example, the driver usually stops the vehicle after positioning it with respect to a white line indicating a parking space. Further, when an electrically-driven vehicle (such as a so-called electric vehicle or hybrid vehicle) is used, the vehicle needs to be stopped in order to charge a vehicle-mounted battery in a non-contact manner under the state where a vehicle-mounted power receiver mounted on the underside of the vehicle is positioned with respect to a power feeder mounted on a road surface.

Driving assistance for stopping the vehicle after positioning it with respect to a target as described above is widely provided by capturing an image of a hard-to-view area (for example, an area behind the vehicle) with a vehicle-mounted camera and displaying the image on a monitor screen. Further, technologies proposed in Patent Literature 1 and Patent Literature 2 each assist the driver in positioning the vehicle, after a target such as white line or power feeder is placed in a blind spot of the vehicle-mounted camera, by causing the monitor screen to display the location of the target estimated from a movement of the vehicle.

PRIOR ART LITERATURES

Patent Literature

Patent Literature 1: JP 2006-238131 A
Patent Literature 2: JP 2012-175764 A

However, the above-mentioned proposed technologies make it possible to roughly position the vehicle, but may not make it easy to accurately position the vehicle with respect to a target.

SUMMARY OF INVENTION

It is an object of the present disclosure to provide a technology that makes it easy to accurately position a vehicle with respect to a target on a road surface before stopping the vehicle.

To achieve the above object, according to an example of the present disclosure, a driving assistance apparatus or driving assistance method is provided as follows. A video image is captured which shows an area around the vehicle, the area including the target. A positioning video image is captured for positioning the vehicle. The positioning video image is displayed in a display monitor. A relative location of the target with respect to the vehicle is acquired. A display mode, which is used when the display monitor displays the video image showing the area around the vehicle, is switched between a first display mode (in which the target moves with respect to the vehicle) and a second display mode (in which the vehicle moves with respect to the target).

Although details will be given later, the first display mode in which the target moves with respect to the vehicle differs from an actual mode (in which the vehicle moves over the road surface). Viewing a video image displayed in the first display mode makes it possible to recognize a rough positional relationship between the target and the vehicle; however, the first display mode does not make it possible to immediately recognize an accurate positional relationship. In contrast, the second display mode in which the vehicle moves with respect to the target is the same as the actual mode in which the vehicle moves over the road surface. Viewing a video image displayed in the second display mode makes it possible to immediately recognize the accurate positional relationship between the target and the vehicle. Those lead to a configuration in which: the first display mode is used for viewing the video image until the vehicle is moved to be near the target; and then the first display mode is switched to the second display mode. Such a configuration may facilitate manipulating of the vehicle so as to stop it after accurately positioning it with respect to the target.

Further, in the driving assistance apparatus according to the example, the positioning video image may be generated from the video image captured by a vehicle-mounted camera, as follows. The video image captured by the vehicle-mounted camera may be first converted to a video image representing an overhead shot of the vehicle; then, the video image after the conversion may be combined with an image (vehicle outline image) indicative of an outline of the vehicle. This may generate the positioning video image.

Displaying the above-described positioning video image on the display monitor enables the driver to easily recognize the positional relationship between the vehicle and the target. Therefore, the vehicle can easily be positioned with respect to the target and stopped.

Further, in the driving assistance apparatus displaying the positioning video image according to the example, when the target is located below the vehicle (adjacent to the underside of the vehicle), the positioning video image may be generated by combining a target image, indicative of the location of the target, with the vehicle outline image; and the generated positioning video image may be thereby displayed in the display monitor.

This enables to accurately position the vehicle with respect to the target even when the target is beneath the vehicle.

Further, in the driving assistance apparatus according to the example, the positioning video image may be generated by combining a video image captured by a vehicle-mounted camera with a vehicle outline image indicative of an outline of the vehicle.

This enables to generate the positioning video image, without converting the video image captured by the vehicle-mounted camera into a video image showing a top view of the vehicle, thereby reducing the processing load for generating the positioning video image.

Further, in the driving assistance apparatus displaying the positioning video image according to the example, when the target is hidden from the vehicle-mounted camera by the vehicle, the positioning video image may be generated by combining a target image, which is indicative of the location of the target, with the vehicle outline image, and the generated positioning video image may be thereby displayed in the display monitor.

This enables to accurately position the vehicle with respect to the target even when the target is hidden by the vehicle.

Further, in the driving assistance apparatus displaying the positioning video image with which the vehicle outline image is combined according to the example, the positioning video image may be generated by combining an image (mark image) with the vehicle outline image, the mark image being indicative of an in-vehicle positioning mark used to position the vehicle with respect to the target.

This enables to align the mark image with the target for positioning purposes, thereby positioning the vehicle more accurately and more easily.

Further, in the driving assistance apparatus according to the example, the positioning video image in the second display mode may be generated when the target is within a switching range predefined around the vehicle, and the generated positioning video image may be thereby displayed in the display monitor.

Thus, when an appropriate range is predefined as the switching range with respect to the vehicle, the display mode for the positioning video image displayed on the display monitor can be switched between the first display mode and the second display mode. As a result, the vehicle can be positioned with respect to the target more accurately and more easily.

Further, the driving assistance apparatus according to the example may be provided as follows. The vehicle may include; an electric motor that generates a driving force for running the vehicle; a battery that supplies electric power to the electric motor; and a power receiver that receives electric power, which is stored in the battery, from an outside source separate from the vehicle in a non-contact manner. In contrast, a power feeder may be provided on a road surface to supply electric power to the power receiver in a non-contact manner. The power receiver of the vehicle may be positioned with respect to the power feeder on the road surface.

To supply electric power efficiently in the non-contact manner from the power feeder on the road surface to the power receiver of the vehicle, it is necessary to stop the vehicle after accurately positioning the vehicle's power receiver with respect to the power feeder. Consequently, when the above-described example of the driving assistance apparatus is used to position the vehicle in the above manner, the vehicle's power receiver can be accurately positioned with respect to the power feeder. As a result, the electric power can be efficiently supplied.

BRIEF DESCRIPTION OF DRAWINGS

The above and other objects, features and advantages of the present disclosure will become more apparent from the following detailed description made with reference to the accompanying drawings. In the drawings:

FIG. 9 is an explanatory diagram illustrating how the target location is set in a second embodiment of the present disclosure;

FIG. 11 is an explanatory diagram illustrating how the vehicle is positioned and stopped in the second embodiment while the vehicle periphery image is displayed in a road-surface-based mode;

FIG. 14 is an explanatory diagram illustrating how the angle of view in the road-surface-based mode is changed in a modification of the second embodiment;

EMBODIMENTS FOR CARRYING OUT INVENTION

Embodiments will now be described to define the content of the present disclosure.

A. Apparatus Configuration

Figure 1:
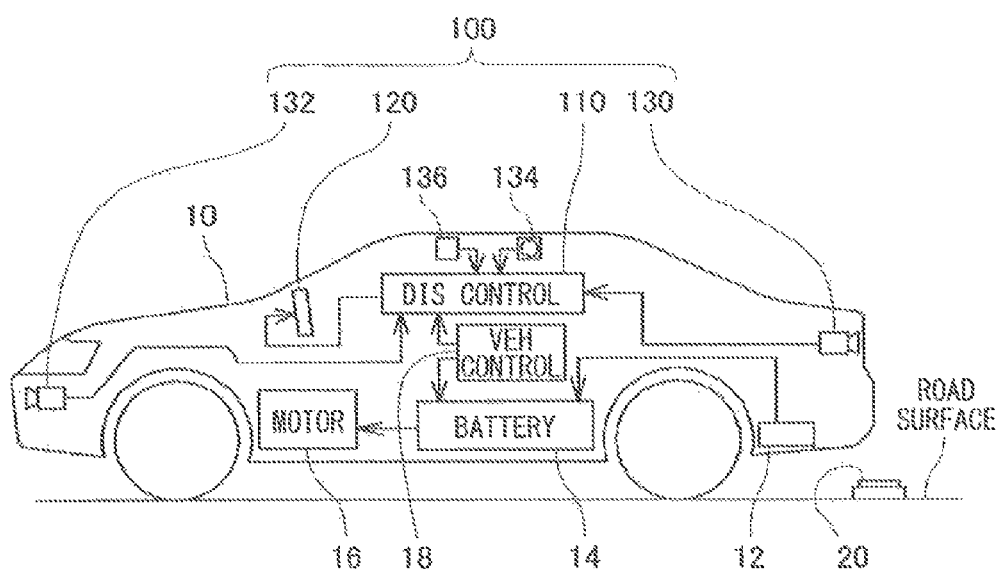
FIG. 1 is an explanatory diagram illustrating an electric vehicle in which a driving assistance apparatus according to an embodiment of the present disclosure is mounted.

FIG. 1 schematically shows a configuration of a vehicle 10 in which a driving assistance apparatus 100 according to an embodiment of the present disclosure is mounted. The vehicle 10 in which the driving assistance apparatus 100 is mounted may be referred to as a host vehicle or subject vehicle. The vehicle 10 shown in FIG. 1 is an electrically-driven vehicle (such as a so-called electric vehicle or hybrid vehicle) that runs by using a driving force generated by an electric motor 16. The vehicle 10 includes a battery 14 for supplying electric power to the electric motor 16, a vehicle control unit 18, and a power receiver 12 connected to the battery 14. The power receiver 12 has a built-in coil. When the power receiver 12 is positioned to face a power feeder 20 mounted on a road surface, the power receiver 12 can receive electric power in a non-contact manner from the power feeder 20 and charge the battery 14. If the power receiver 12 is not accurately positioned with respect to the power feeder 20, it is difficult to efficiently receive the electric power. The driving assistance apparatus 100 is thus mounted in the vehicle 10 according to the present embodiment so that the vehicle 10 can be stopped with the power receiver 12 positioned to face the power feeder 20.

As shown in FIG. 1, the driving assistance apparatus 100 according to the present embodiment includes a vehicle-mounted camera 130 disposed on the rear of the vehicle 10, a vehicle-mounted camera 132 disposed on the front of the vehicle 10, a display control circuit 110, and a display monitor 120. The vehicle-mounted camera 130 captures an image of an outer region viewable from the rear of the vehicle 10 in the form of video. The vehicle-mounted camera 132 captures an image of an outer region viewable from the front of the vehicle 10 in the form of video. A video image captured by the vehicle-mounted cameras 130, 132 is output to the display monitor 120 through the display control circuit 110. The display control circuit 110 is mainly formed of a microcomputer that includes a CPU and a memory, and controls the image to be displayed by the display monitor 120 that displays an image. In the present embodiment, the driving assistance apparatus 100 also includes vehicle-mounted cameras 134, 136 that each capture an image of an outer region viewable from the left or right side of the vehicle 10 in the form of video. An output from these vehicle-mounted cameras 134, 136 is also input to the display control circuit 110.

Figure 2:
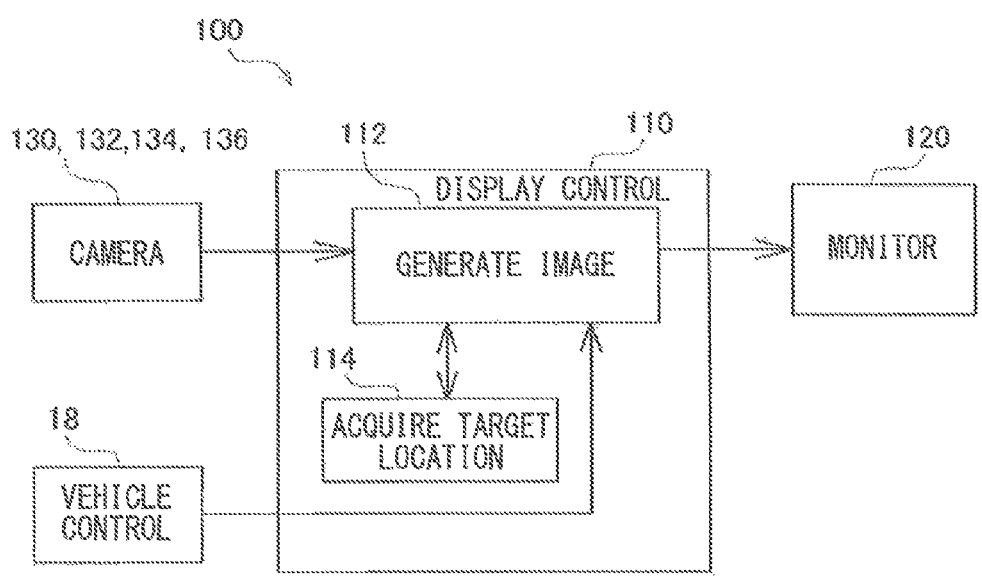
FIG. 2 is a block diagram illustrating the driving assistance apparatus according to an embodiment of the present disclosure.

As shown in FIG. 2, the display control circuit 110 according to the present embodiment includes an image generation section 112 and a target location acquisition section 114. The image generation section 112 and the target location acquisition section 114 are obtained when functions performed by the display control circuit 110 are conveniently classified according to their purpose. It does not necessarily signify that there are two physical substances, namely, the image generation section 112 and the target location acquisition section 114. Thus, the image generation section 112 and the target location acquisition section 114 may be implemented by a part of a computer program or implemented as a part of a circuit board formed of an IC chip and other electronic parts.

Upon receipt of the video image captured by the vehicle-mounted cameras 130, 132, 134, 136, the image generation section 112 generates a video image to be displayed on the display monitor 120. The target location acquisition section 114 acquires a target location with respect to which the vehicle is to be positioned based on the video image. In this instance, the target location is acquired in the form of a relative location with respect to the vehicle 10. Although described in detail later, information about the target location acquired by the target location acquisition section 114 is supplied to the image generation section 112 and used to switch a display mode of video image in the display monitor 120. In the present embodiment, it is assumed that the vehicle 10 is to be stopped in such a manner as to let the power receiver 12 face the power feeder 20 on the road surface. Therefore, the power feeder 20 on the road surface is a target for positioning in the present embodiment. However, it is obvious that the target for positioning is not limited to the power feeder 20. When, for instance, the vehicle 10 is to be stopped in alignment with a white line or wheel stop on a road surface, the white line or wheel stop on the road surface may be the target for positioning.

In this application, the word "information" is used not only as an uncountable noun but also as a countable noun.

Further, when the vehicle 10 approaches the target for positioning, the target may be placed in a blind spot of the vehicle-mounted cameras 130, 132, 134, 136. Even in such a situation, the image generation section 112 can receive information about the steering angle of the steering wheel of the vehicle 10 and the amount of movement of the vehicle 10 from the vehicle control unit 18, which controls the overall operation of the vehicle 10. The image generation section 112 can then estimate the target location in order to let the display monitor 120 display an image indicative of the target location, that is, a target image. In the present embodiment, a video image displayed on the display monitor 120 may be referred to as a positioning video image. Further, the image generation section 112 may be referred to as an image generation section or device/means. Moreover, the target location acquisition section 114 may be referred to as an acquisition section or device/means.

In the present disclosure, the Japanese word "Shudan" corresponds to a "means" or "device" in English.

B. First Embodiment

The above-described driving assistance apparatus 100 performs a later-described vehicle stop assistance process in order to assist a driver of the vehicle 10 in positioning the vehicle 10 with respect to a target and stopping it. To facilitate understanding of the vehicle stop assistance process, the subsequent description will be given by using a concrete example shown in FIG. 3 (a case where the vehicle 10 is moved backward toward and positioned with respect to the power feeder 20 on a road surface of a parking lot and is then stopped).

Figure 3:
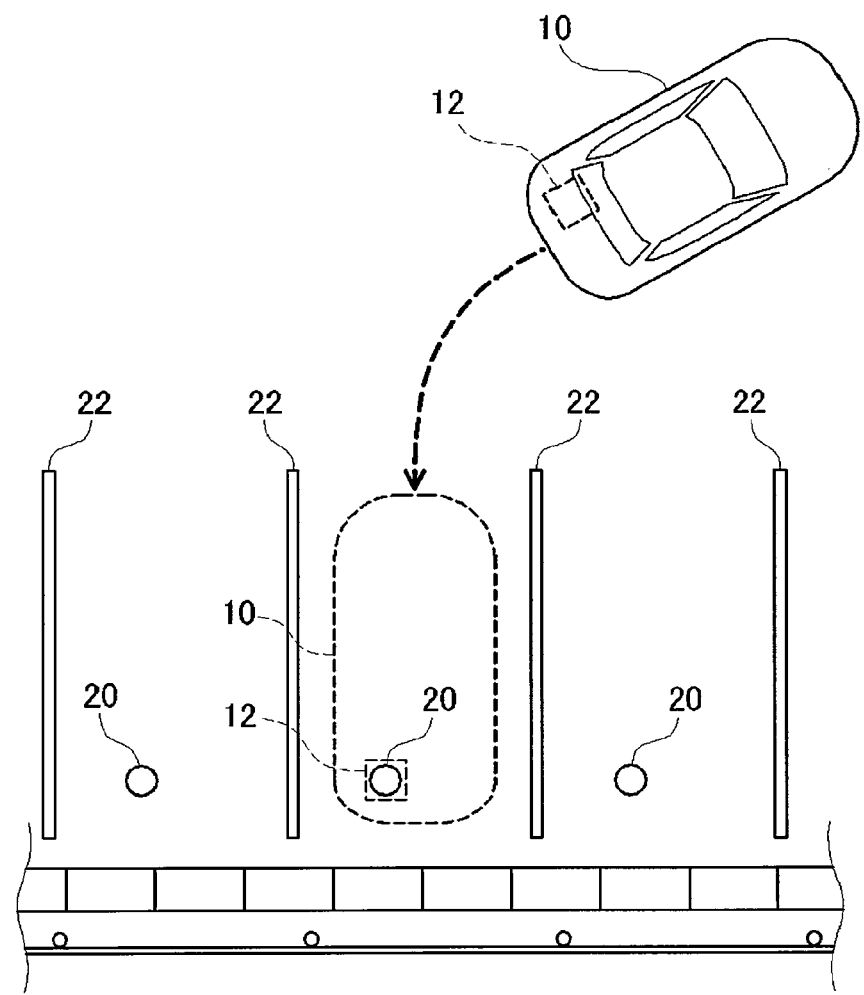
FIG. 3 is an explanatory diagram illustrating how a vehicle is stopped with a power receiver positioned with respect to a power feeder on a road surface.

In the example of FIG. 3, a parking space for one unit of the vehicle 10 is marked by a white line 22, and each parking space is provided with one unit of the power feeder 20. When the battery 14 of the vehicle 10 is to be charged, the vehicle 10 is moved backward as indicated by a broken-line arrow in FIG. 3 and then stopped when the power receiver 12 is positioned immediately above the power feeder 20. If, in this instance, the power receiver 12 is not accurately positioned with respect to the power feeder 20, power reception efficiency drastically decreases. Therefore, the power receiver 12 needs to be accurately positioned with respect to the power feeder 20. The driving assistance apparatus 100 according to a first embodiment of the present disclosure thus initiates the following vehicle stop assistance process when the driver places a gear shift lever (not shown) of the vehicle 10 in a reverse position.

B-1. Vehicle Stop Assistance Process

Figure 4:
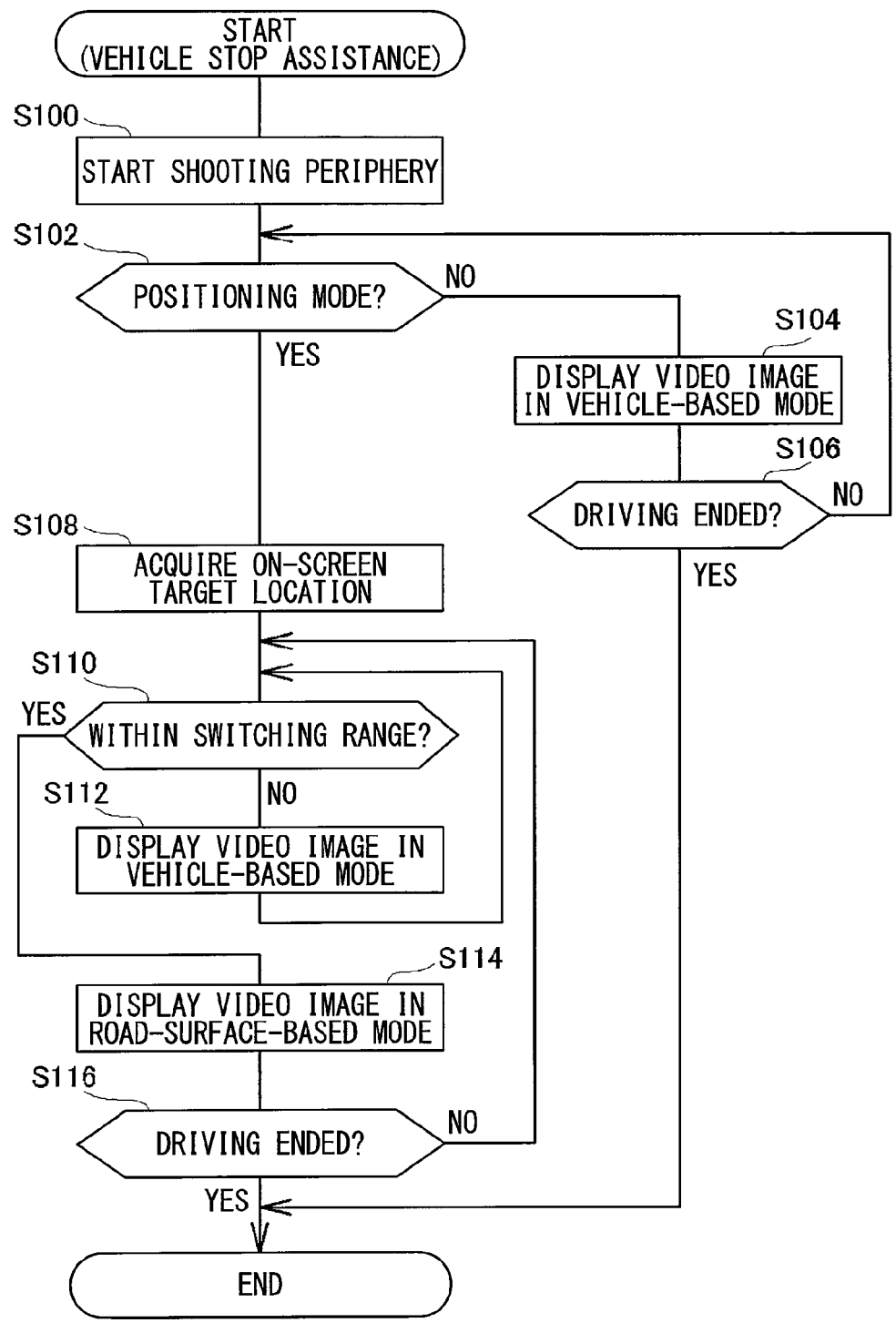
FIG. 4 is a flowchart illustrating a vehicle stop assistance process that is performed by the driving assistance apparatus according an embodiment of the present disclosure.

FIG. 4 shows a flowchart to illustrate the vehicle stop assistance process according to the first embodiment. It is noted that a flowchart or the processing of the flowchart in the present application includes sections (also referred to as steps), each of which is represented, for instance, as S100. Further, each section can be divided into several subsections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

When the vehicle stop assistance process starts as indicated in the flowchart, a video image showing an area around the vehicle 10 begins to be captured (S100). As described earlier with reference to FIG. 1, the vehicle-mounted cameras 130, 132 are each disposed on the front or rear of the vehicle 10, and the vehicle-mounted cameras 134, 136 are each disposed on the left or right side of the vehicle 10. Therefore, an image of the periphery of the vehicle 10 can be entirely captured by using the vehicle-mounted cameras 130, 132, 134, 136.

Next, the driving assistance apparatus 100 determines whether a positioning mode is selected by the driver of the vehicle 10 (S102). The positioning mode is selected by the driver when the driver attempts to position the vehicle 10 with respect to a target on a road surface (the power feeder 20 in the current example) and then stop the vehicle. When the vehicle 10 is to be positioned with respect to the target on the road surface and then stopped, the driver presses a manipulation button (not shown) to select the positioning mode. If the display monitor 120 is of a touch panel type, the positioning mode can be selected by touching an on-screen button.

If it is determined in S102 that the positioning mode is not selected (S102: NO), the display mode of the video image captured by the vehicle-mounted cameras 130, 132, 134, 136 is changed to a vehicle-based mode to let the display monitor 120 display a converted video image (S104). The vehicle-based mode is described below. If, for instance, the vehicle 10 running on a road surface is viewed from the road surface, it seems that the vehicle 10 is moving, but the road surface is not moving. By contrast, if the road surface is viewed from the vehicle 10, it seems that the road surface is moving, but the vehicle 10 is not moving. In the vehicle-based mode, the area around the vehicle 10 is displayed as viewed from the vehicle 10 (displayed in such a manner that the road surface moves, but the vehicle 10 does not). The image captured by the vehicle-mounted cameras 130, 132, 134, 136 is naturally in the vehicle-based mode. A mode in which an image is displayed in a state where the vehicle 10 is viewed from the road surface (displayed in such a manner that the vehicle 10 moves, but the road surface does not) is referred to as the road-surface-based mode in this document. In the first embodiment, the vehicle-based mode may be referred to as a first display mode, and the road-surface-based mode may be referred to as a second display mode.

In the first embodiment, the display monitor 120 does not display the video image captured by the vehicle-mounted cameras 130, 132, 134, 136 on an as-is basis. The first embodiment performs coordinate conversion to obtain a video image as viewed from above the vehicle 10 (a top-view image), combines the top-view image with an image showing the outline of the vehicle 10 (a vehicle outline image), and displays the resulting video image. In S104, the display monitor 120 displays the resulting video image (the video image obtained when the top-view image is combined with the vehicle outline image) in the vehicle-based mode. A process of converting the video image captured by the vehicle-mounted cameras 130, 132, 134, 136 to the top-view image and combining the top-view image with the vehicle outline image is performed by the image generation section 112.

Next, a check is performed to determine whether the vehicle 10 is stopped to indicate the end of driving (S106). Whether the driving is ended can be determined based on information from the vehicle control unit 18. If the driving is not ended (S106: NO), processing returns to S102. In S102, a check is performed to determine whether the positioning mode is selected. If it is determined in S102 that the positioning mode is not selected (S102: NO), the video image captured by the vehicle-mounted cameras 130, 132, 134, 136 (or more precisely, the video image obtained by converting the captured video image to a top-view image and combining it with the vehicle outline image) is displayed on the screen of the display monitor 120 in the vehicle-based mode (S104). When the positioning mode is not selected by the driver (S102: NO), the video image captured by the vehicle-mounted cameras 130, 132 is displayed on the screen of the display monitor 120 in the vehicle-based mode until the vehicle 10 is stopped to indicate the end of driving.

Figure 5:
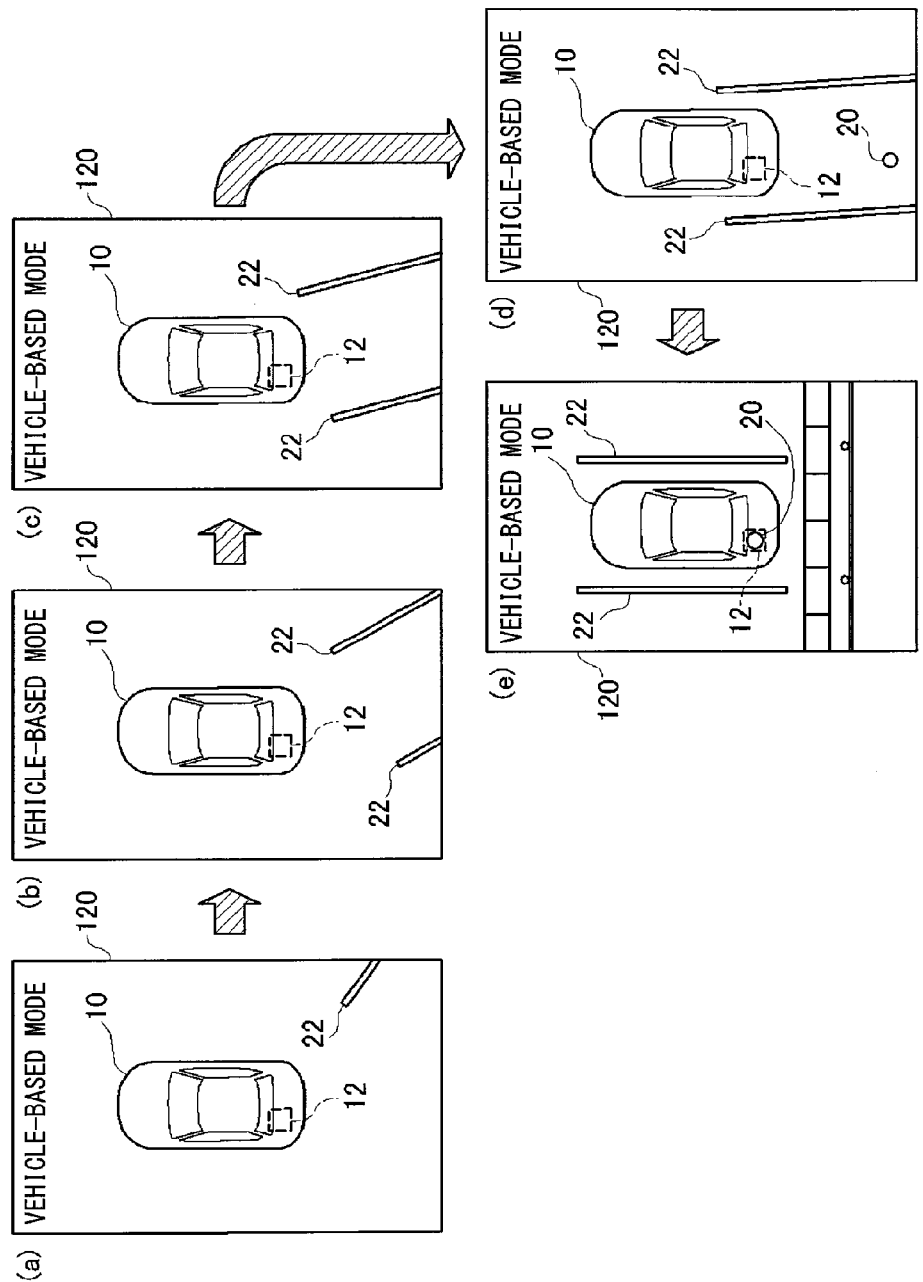
FIG. 5 is an explanatory diagram illustrating a video image that is displayed on a display monitor when a driver stops the vehicle without selecting a positioning mode.

FIG. 5 illustrates a video image that is displayed on the display monitor 120 if the driver stops the vehicle 10 without selecting the positioning mode. When the positioning mode is not selected, the video image displayed on the display monitor 120 is in the vehicle-based mode, as mentioned earlier. Therefore, as illustrated in FIG. 5, the video image displayed on the display monitor 120 is in a mode in which a road surface moves, but the image of the vehicle 10 remains displayed at the center. If, in the example shown in FIG. 5, a target on the road surface (the power feeder 20 in this case) is placed in a blind spot of the vehicle-mounted cameras 130, 132, 134, 136 (for example, placed beneath the vehicle 10), the video image is displayed by adding a pre-stored image of the target (the power feeder 20 in this case) to a relevant on-screen location estimated from the movement of the vehicle 10. The power feeder 20 shown in FIG. 5(*e*) is displayed by combining the images in the above-described manner. In the example shown in FIG. 5, the image indicative of the vehicle 10 (the vehicle outline image) shows windowpanes and roof as well. In contrast, an alternative is to use a simple image that shows only the outline of the vehicle 10. A small rectangle indicated by a broken line in the image of the vehicle 10 represents the location of the power receiver 12. In the first embodiment, the image of the rectangle may be referred to as a mark image. Further, the upper left portion of the display monitor 120 indicates that the currently displayed video image is in the vehicle-based mode.

In the vehicle-based mode, the video image is displayed in such a manner that the road surface moves. Therefore, as shown in FIG. 5, the displayed video image indicates that a white line 22 on the road surface gradually changes its orientation and approaches the vehicle 10. In reality, however, it goes without saying that the vehicle 10 approaches the white line 22 on the road surface. Thus, the video image is displayed in a mode that differs from the reality. However, the vehicle-based mode makes it possible to recognize a rough positional relationship between the vehicle 10 and a parking space indicated by the white line 22. In contrast, a different situation arises if an attempt is made to accurately position the power receiver 12 of the vehicle 10 with respect to the power feeder 20 disposed within the parking space. More specifically, as the video image displayed on the display monitor 120 is in a mode different from the reality, the driver has to mentally convert the video image displayed on the display monitor 120 to a video image displayed in a real mode. As a result, steering wheel manipulation or brake manipulation by the driver is likely to be slightly delayed.

This makes it difficult to accurately position the vehicle 10. The driver thus selects the positioning mode in a situation where the vehicle 10 needs to be accurately positioned. The positioning mode may be selected before the vehicle 10 begins to move backward or while the vehicle 10 is moving backward.

Figure 6:
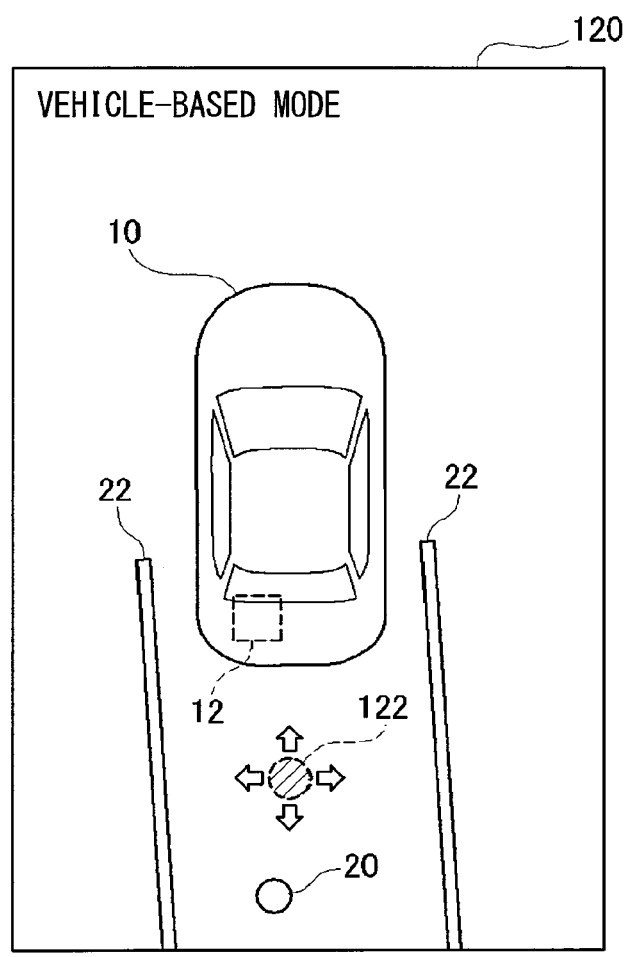
FIG. 6 is an explanatory diagram illustrating how a target location is set in the vehicle stop assistance process according a first embodiment of the present disclosure.

When the driver selects the positioning mode, the query in S102 of the vehicle stop assistance process shown in FIG. 4 is answered "YES". Next, a location (target location) at which a target (the power feeder 20 in this case) is visible on the screen of the display monitor 120 is acquired (S108). The simplest method of acquiring the target location is to let the driver designate the target location by moving a cursor 122 on the screen of the display monitor 120 as illustrated in FIG. 6. An alternative is to detect the target location by performing an image recognition process on the video image displayed on the display monitor 120. Another alternative is to detect the target by establishing wireless communication with the target or by using a sonar or a radar, and determine the target location on the display monitor 120.

Figure 7:
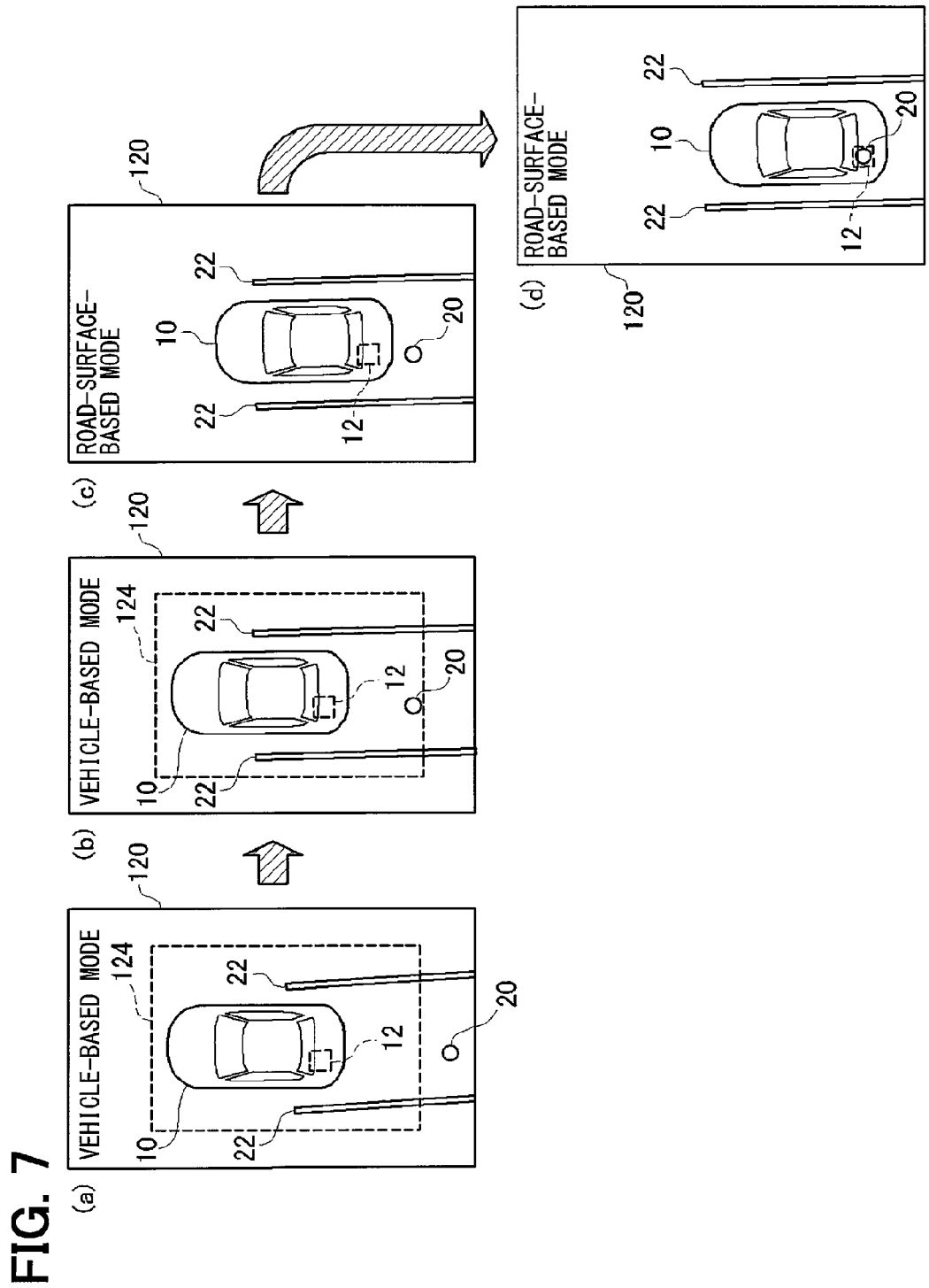
FIG. 7 is an explanatory diagram illustrating how the vehicle is positioned with respect to a target on a road surface and stopped in the vehicle stop assistance process according to the first embodiment.

Next, a check is performed to determine whether the location of the target (power feeder 20) is within a predefined switching range (S110 of FIG. 4). The switching range is predefined for changing the display mode in which the video image is displayed on the display monitor 120. A predetermined periphery range is predefined as the switching range with respect to the location of the vehicle 10. In FIG. 7(a), the switching range 124 predefined around the vehicle 10 is indicated by a broken-line rectangle. In the example of FIG. 7(a), the target (power feeder 20) is still positioned outside the switching range 124. In this instance, therefore, the query in S110 of FIG. 4 is answered "NO". As a result, the display monitor 120 continues to display a top-view video image of an area around the vehicle 10 in the vehicle-based mode (S112).

Next, a check is performed again to determine whether the target (power feeder 20) is located within the switching range (S110). If it is determined that the target is not located within the switching range (S110: NO), the video image showing the area around the vehicle 10 continues to be displayed in the vehicle-based mode (S112). It is essential that the image generation section 112 be capable of determining whether the target (power feeder 20) is within the switching range. The driver need not always be capable of determining whether the target (power feeder 20) is within the switching range. Therefore, the display monitor 120 may display the switching range 124 as shown in FIG. 7(a); however, it is not compulsory for the display monitor 120 to display the switching range 124. The first embodiment displays the switching range 124 while the positioning mode is selected and, simultaneously, the image of the area around the vehicle 10 is displayed in the vehicle-based mode; in contrast, the first embodiment does not display the switching range 124 while the image is displayed in the road-surface-based mode. This enables the driver to easily recognize whether the image is displayed in the vehicle-based mode or in the road-surface-based mode depending on whether the switching range 124 is displayed.

When the vehicle 10 is moved backward toward the target (power feeder 20) with the above determination process repeated, it is determined sooner or later that the target is within the switching range 124 (S110: YES). FIG. 7(b) shows an image that is displayed on the display monitor 120 when the target (power feeder 20) enters the switching range 124. Here, the target (power feeder 20) is assumed to have entered the switching range 124 when the target is entirely within the switching range 124 (see FIG. 7(b)). Alternatively, the target may be assumed to have entered the switching range 124 when a part of the target or the center of the target is within the switching range 124.

If the target (power feeder 20) is within the switching range 124 (S110: YES), a top-view image showing the area around the vehicle 10 is displayed on the display monitor 120 in the road-surface-based mode (S114). As mentioned earlier, an image displayed in the road-surface-based mode is obtained when the vehicle 10 is viewed from the road surface; the image indicates that the vehicle 10 moves while the road surface stays put. Further, as shown in FIG. 2, the image generation section 112, which generates the top-view image, is able to acquire information about the movement direction of the vehicle 10 (the steering angle of the steering wheel) and information about the movement amount of the vehicle 10 from the vehicle control unit 18. Therefore, the image generation section 112 can generate a top-view image in the road-surface-based mode by performing an additional coordinate conversion process on the top-view image in the vehicle-based mode, which is derived from coordinate conversion of the image captured by the vehicle-mounted cameras 130, 132, in such a manner as to move the position of a coordinate origin on the basis of the movement direction and movement amount of the vehicle 10.

After the video image in the road-surface-based mode is displayed on the display monitor 120 (S114) as described above, a check is performed to determine whether the driving is ended when the vehicle is completely stopped (S116). Whether the driving is ended can be determined by the information acquired from the vehicle control unit 18. If it is determined in S116 that the driving is not ended (S116: NO), a check is performed to determine whether the target (power feeder 20) is within the switching range 124 (S110). Here, whether the target is within the switching range 124 is determined again in consideration of a case where the driver attempts to position the vehicle 10 again due to a previous positioning failure.

If the target (power feeder 20) is within the switching range 124 (S110: YES), the video image is displayed in the road-surface-based mode (S114). If, on the other hand, the target (power feeder 20) is not within the switching range 124 (S110: NO), the display mode of the display monitor 120 reverts to the vehicle-based mode (S112). Next, a check is performed again to determine whether the target (power feeder 20) is within the switching range 124 (S110). When the above-described process is repeated until the vehicle 10 is eventually positioned and stopped, it is determined in S116 that the driving is ended (S116: YES). Upon completion of S116, the vehicle stop assistance process shown in FIG. 4 terminates.

FIGS. 7(c) and (d) illustrate how the display monitor 120 displays the video image in the road-surface-based mode during the time interval between the instant at which the target (power feeder 20) enters the switching range 124 and the instant at which the vehicle 10 is completely positioned. When the display mode switches to the road-surface-based mode, the upper left portion of the display monitor 120 changes to indicate that the currently displayed video image is in the road-surface-based mode, as shown in FIGS. 7(c) and (d).

As described above, in the vehicle stop assistance process according to the first embodiment, the display monitor 120 displays the video image showing the area around the vehicle 10 in the vehicle-based mode until the vehicle 10 approaches the target for positioning (the power feeder 20 in the current example). The video image displayed in the vehicle-based mode does not enable the driver to immediately recognize an accurate positional relationship between the target and the vehicle 10, but permits the driver to recognize a rough positional relationship between them. Therefore, the driver can move the vehicle 10 toward the target while viewing the video image displayed on the display monitor 120 (see FIG. 5(a) to (d) and FIG. 7(a)). Next, when the vehicle 10 approaches the target so that the target is within the switching range 124, which is predefined with respect to the vehicle 10, the video image displayed on the display monitor 120 switches to the road-surface-based mode. The road-surface-based mode shows that the vehicle 10 moves on the road surface in the same manner as in the real mode. Therefore, the driver can immediately recognize the accurate positional relationship between the target and the vehicle 10 (see FIG. 7(b) to (d)). As a result, the driver can accurately determine whether the vehicle 10 is currently moving in a proper direction. This makes it possible to stop the vehicle 10 after accurately positioning it with respect to the target on the road surface.

B-2. Modification of First Embodiment

The first embodiment has been described on the assumption that when the target on the road surface (power feeder 20) is determined to be within the switching range 124, the display mode of the video image switches from the vehicle-based mode to the road-surface-based mode without changing the position at which the vehicle 10 is displayed on the display monitor 120. Alternatively, the position at which the vehicle 10 is displayed on the display monitor 120 may be changed when the display mode switches from the vehicle-based mode to the road-surface-based mode.

Figure 8:
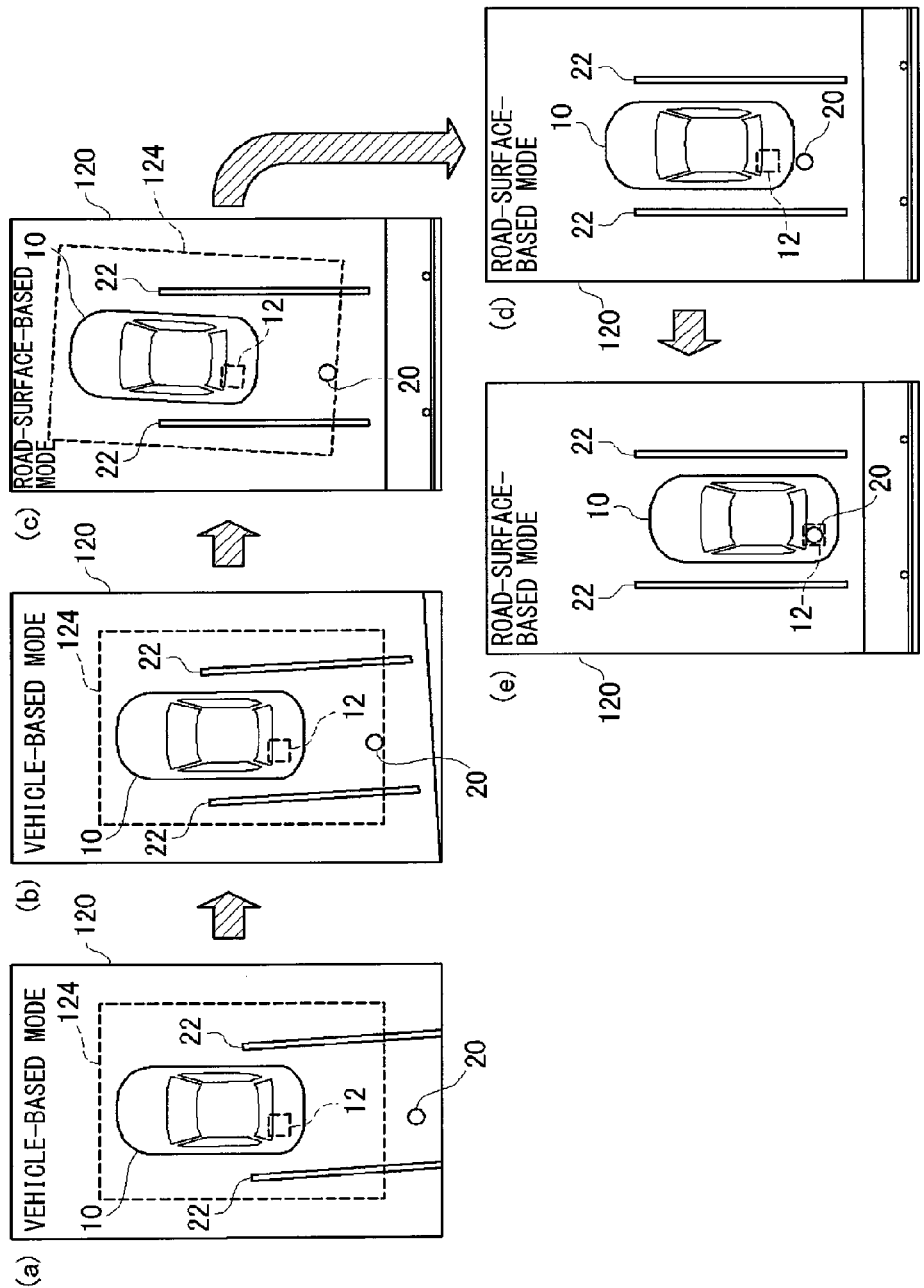
FIG. 8 is an explanatory diagram illustrating how the vehicle is positioned and stopped in a modification of the first embodiment.

FIG. 8 illustrates a modification of the first embodiment, which has been described above, by indicating how the video image is displayed on the display monitor 120. As is the case with the first embodiment described earlier, the display monitor 120 displays the video image in the vehicle-based mode until the target (power feeder 20) enters the switching range 124 (see FIG. 8(a)). When the vehicle 10 is subsequently moved backward, the target (power feeder 20) approaches the vehicle 10 and, sooner or later, enters the switching range 124 as shown in FIG. 8(b). At this stage, the vehicle 10 is displayed substantially at the center of the screen of the display monitor 120, and the target (power feeder 20) is displayed just inside the switching range 124 (displayed relatively close to an edge of the screen of the display monitor 120). When the display mode of the display monitor 120 switches to the road-surface-based mode in the above-described state, the vehicle 10, which has been displayed substantially at the center of the screen, moves toward the target (power feeder 20), which is displayed relatively close to the edge of the screen. Eventually, the driver positions the vehicle 10 while viewing the video image displayed close to the edge of the screen of the display monitor 120.

Consequently, the positions at which the vehicle 10 and the target (power feeder 20) are displayed moved so that the driver does not have to view the edge of the screen of the display monitor when positioning the vehicle 10 with respect to the target (power feeder 20) (see FIG. 8(c)). Further, in the above instance, the video image may be rotated so that the vehicle 10 is oriented squarely when it is positioned with respect to the target (power feeder 20). For example, although FIG. 8(b) shows that the white line 22 on the road surface is slightly tilted with respect to the screen of the display monitor 120, the video image may be rotated as needed until the white line 22 is displayed squarely as shown in FIG. 8(c).

Subsequently, as is the case with the first embodiment, the driver positions the vehicle 10 with respect to the target (power feeder 20) while viewing the video image that is displayed on the display monitor 120 in the road-surface-based mode (see FIG. 8(d) and FIG. 8(e)). Thus, the driver can position the vehicle 10 with respect to the target while viewing the video image that shows the vehicle 10 in a region near the center of the screen of the display monitor 120 (in a region easily viewable by the driver). Further, correcting the orientation of the video image as shown in FIG. 8(c) makes it easier to recognize the positional relationship between the target and the vehicle 10. As a result, the vehicle 10 can be positioned with increased ease.

C. Second Embodiment

The first embodiment has been described on the assumption that a video image (top-view image) showing the area around the vehicle 10 as viewed from above is used as the video image for positioning the vehicle 10, and that the display mode of the top-view image is switched between the vehicle-based mode and the road-surface-based mode. In contrast, the display mode can be switched between the vehicle-based mode and the road-surface-based mode without need of using a top-view image. If, for example, the vehicle 10 is moved backward to position it with respect to the target (power feeder 20) as shown in FIG. 3, it is possible to use a video image captured by the vehicle-mounted camera 130 disposed on the rear of the vehicle 10. A second embodiment of the present disclosure will now be described on the assumption that the display mode is switched between the vehicle-based mode and the road-surface-based mode without using a top-view image. The subsequent description of the second embodiment mainly deals with the difference from the first embodiment. Elements identical with those of the first embodiment are designated by the same reference numerals as those of their counterparts and will not be redundantly described in detail.

FIG. 9(a) shows that the display monitor 120 displays a video image captured by the vehicle-mounted camera 130 when the vehicle 10 is moved backward. The video image captured by the vehicle-mounted camera 130 is in the vehicle-based mode in which the displayed vehicle 10 stays put while the displayed road surface moves. Further, the vehicle-mounted camera 130 incorporates a wide-angle lens so that the captured video image shows a part of the outline of the vehicle 10 (shows a part of a bumper in the example of FIG. 9). In the example of FIG. 9(a), a portion of the displayed video image that shows the outline of the vehicle 10 is combined with a pre-stored image showing the outline of the vehicle 10 (vehicle outline image) in order to enable the driver to easily recognize the outline of the vehicle 10 shown in the video image.

When the vehicle 10 approaches the target (power feeder 20) so that the target displayed on the screen of the display monitor 120 is easily recognizable, the driver selects the positioning mode (S102: YES; see FIG. 4) so that the location of the target (power feeder 20) is acquired (S108 of FIG. 4). The location of the target can be acquired by various methods. However, the simplest method is to let the driver designate the location of the target (power feeder 20) by moving the cursor 122 on the screen of the display monitor 120 as illustrated in FIG. 9(b).

Subsequently, while the video image captured by the vehicle-mounted camera 130 is displayed in the vehicle-based mode, a check is performed to determine whether the target (power feeder 20) is within the switching range 124 (S110 of FIG. 4). As is the case with the first embodiment described earlier, a predetermined region is predefined with respect to the vehicle 10 as the switching range 124. If the result of determination indicates that the target (power feeder 20) is not within the switching range 124 (S110: NO; see FIG. 4), the video image continues to be displayed in the vehicle-based mode (S112 of FIG. 4).

Figure 10:
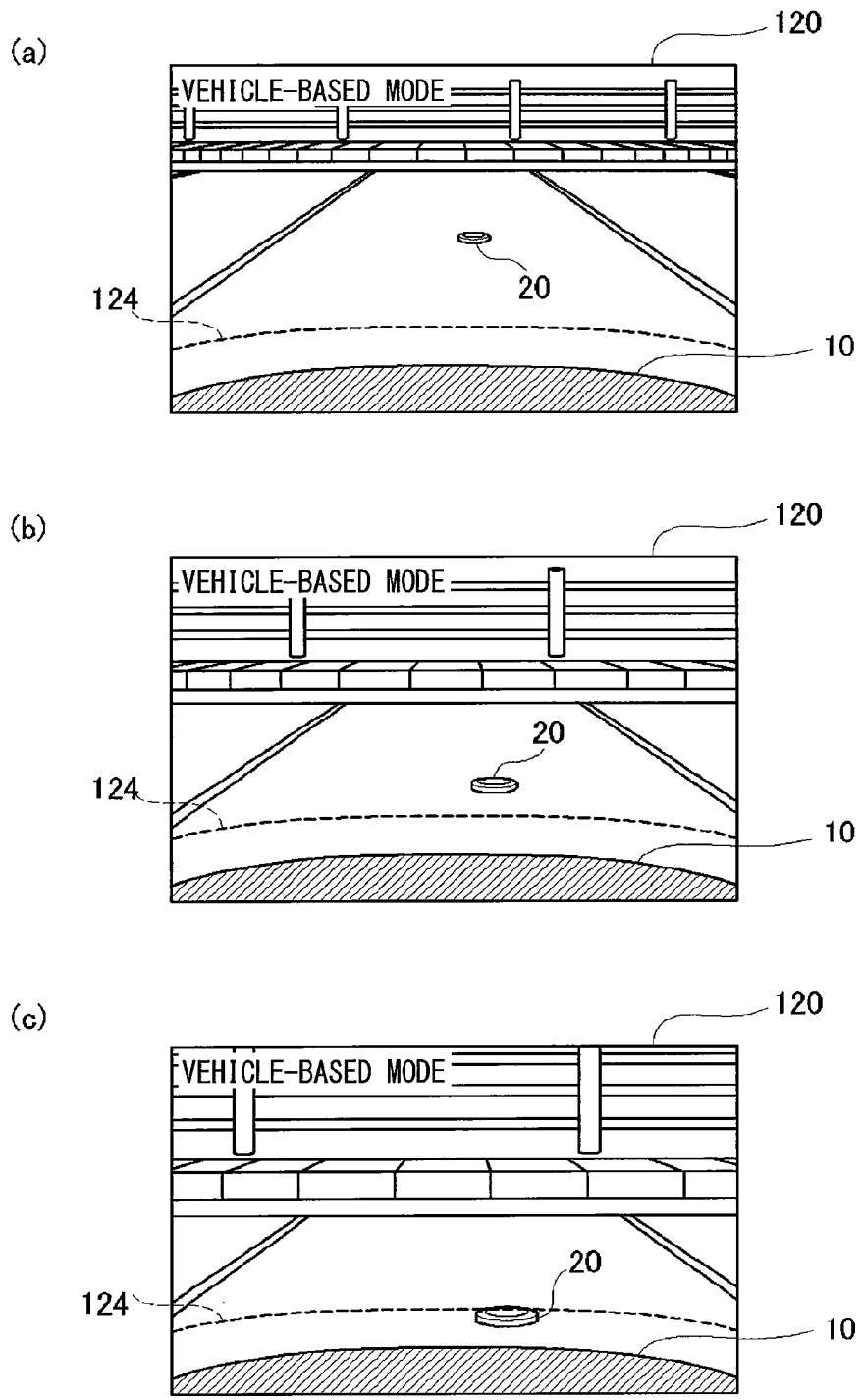
FIG. 10 is an explanatory diagram illustrating how the vehicle approaches a target in the second embodiment while a vehicle periphery image is displayed in a vehicle-based mode.

FIG. 10 illustrates a video image that is displayed on the display monitor 120 during the time interval between the instant at which the target (power feeder 20) is located outside the switching range 124 and the instant at which the target (power feeder 20) enters the switching range 124. As is the case with the first embodiment described earlier, the second embodiment is described on the assumption that the switching range 124 is displayed on the screen of the display monitor 120. However, the switching range 124 need not always be displayed. Further, FIG. 10 assumes that the predefined switching range 124 is outside a region where the target is hidden by the vehicle 10 and placed in a blind spot of the vehicle-mounted camera 130. Alternatively, the region where the target is placed in the blind spot of the vehicle-mounted camera 130 may be predefined as the switching range 124.

When the vehicle 10 approaches the target (power feeder 20) while the video image is displayed in the vehicle-based mode as shown in FIGS. 10(*a*) and (*b*), the video image displayed on the screen of the display monitor 120 indicates that the target (power feeder 20) approaches the stopped vehicle 10. Then, sooner or later, the target (power feeder 20) enters the switching range 124 as shown in FIG. 10(*c*).

When the target (power feeder 20) enters the switching range 124, the display mode of the video image displayed on the display monitor 120 switches to the road-surface-based mode as shown in FIG. 11 (S114 of FIG. 4). The video image displayed in the road-surface-based mode indicates that the image indicative of the outline of the vehicle 10 (vehicle outline image) moves toward the target (power feeder 20) while the position at which the target (power feeder 20) is displayed on the screen of the display monitor 120 stays put. Further, when the target (power feeder 20) is hidden by the vehicle 10 and cannot be captured by the vehicle-mounted camera 130 as shown in FIG. 11(*b*), a pre-stored image of the target (power feeder 20) is used instead of an actually captured image of the target (power feeder 20) and combined with the video image captured by the vehicle-mounted camera 130 to display the resulting combined image on the screen of the display monitor 120. Then, information about the movement direction and movement amount of the vehicle 10 is acquired from the vehicle control unit 18 to move the position at which to display the image of the target (power feeder 20).

Further, as the vehicle 10 approaches the target (power feeder 20), a portion indicative of the vehicle 10 (a finely hatched portion of FIG. 11) moves upward on the screen of the display monitor 120. Then, sooner or later, an image indicative of the location of the power receiver 12 mounted on the vehicle 10 appears on the screen of the display monitor 120. In FIG. 11(*b*), the displayed image indicative of the location of the power receiver 12 is roughly hatched. This image (the image indicative of the location of the power receiver 12) is a pre-stored image, and not actually captured by the vehicle-mounted camera 130. The image indicative of the location of the power receiver 12 is associated in advance with an appropriate position relative to the outline of the vehicle 10 so that it serves as a mark for positioning the power receiver 12 of the vehicle 10 with respect to the target (power feeder 20). In the second embodiment, therefore, the image indicative of the location of the power receiver 12 may be referred to as a mark image.

The driver of the vehicle 10 moves the vehicle 10 backward so that the image (mark image) indicative of the location of the power receiver 12 displayed on the screen of the display monitor 120 coincides with the target (power feeder 20). When the mark image indicative of the location of the power receiver 12 coincides with the target (power feeder 20) as shown in FIG. 11(*c*), it is determined that positioning is completed, and then the driving of the vehicle 10 terminates. Meanwhile, a part of the white line 22 in FIG. 11(*c*) is displayed by a broken line to indicate that the white line 22 is displayed as a background image of the vehicle 10. In the second embodiment, which is described above, the video image is displayed in the vehicle-based mode before the target (power feeder 20) enters the switching range 124 and displayed in the road-surface-based mode when the target (power feeder 20) enters the switching range 124, as is the case with the first embodiment. This enables the driver to accurately position the power receiver 12 of the vehicle 10 with respect to the target (power feeder 20).

In the road-surface-based mode, the area around the vehicle 10 is displayed in such a manner that it stays put as shown in FIG. 11. However, as the vehicle-mounted camera 130, which captures an image of the area around the vehicle 10, is mounted on the vehicle 10, the video image actually captured by the vehicle-mounted camera 130 is such that objects around the vehicle 10 look greater as the vehicle 10 approaches the target (power feeder 20). If such a video image displayed as is, it is not an appropriate image in the road-surface-based image because it looks as if the area around the vehicle 10 approaches the vehicle 10. The second embodiment thus makes it possible to display the video image in the road-surface-based mode by changing the angle of view on the basis of the movement of the vehicle 10 when the video image captured by the vehicle-mounted camera 130 is to be displayed on the display monitor 120.

Figure 12:
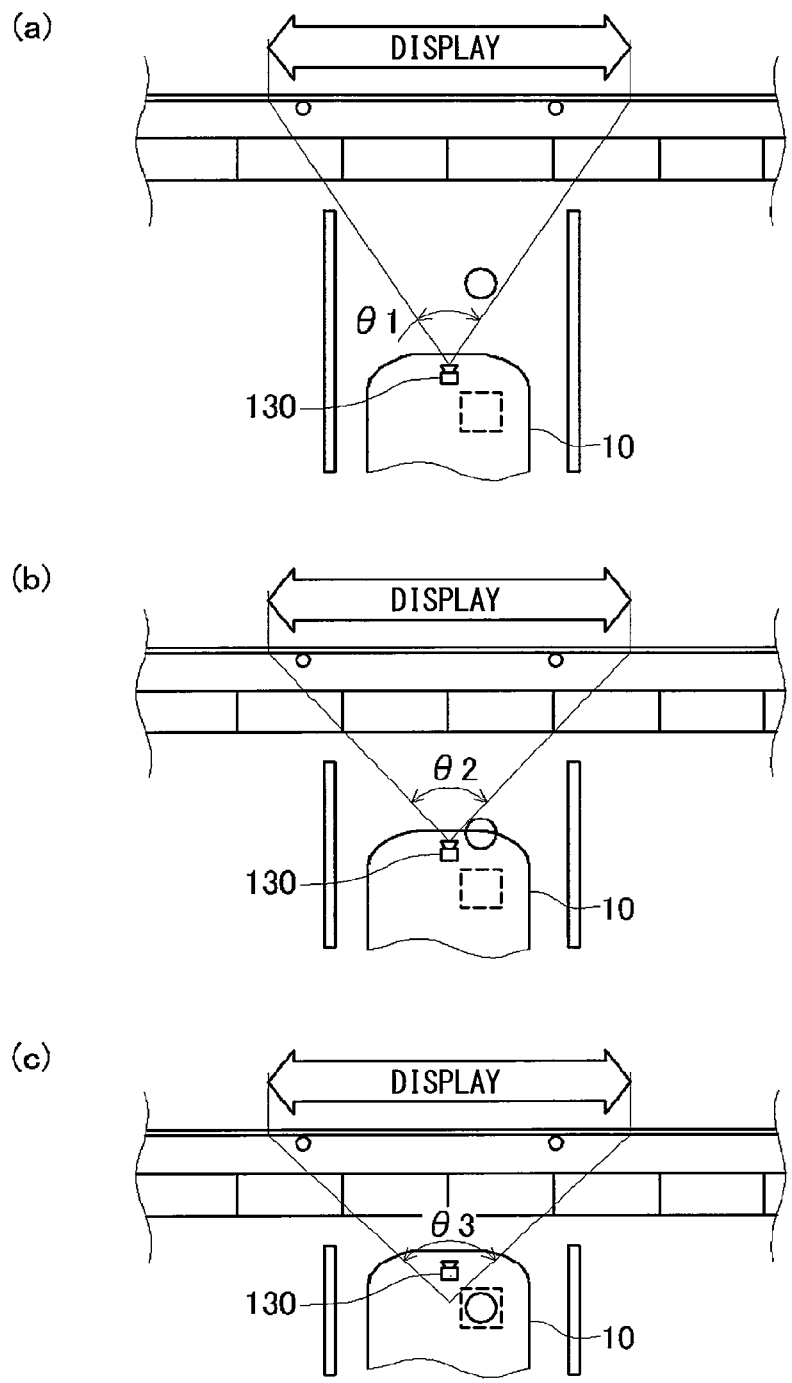
FIG. 12 is an explanatory diagram illustrating how to change an angle of view for capturing the vehicle periphery image in the road-surface-based mode.

FIG. 12 shows the reason why the video image can be displayed in the road-surface-based mode by changing the angle of view of the video image captured by the vehicle-mounted camera 130. FIG. 12(*a*) assumes, for example, that the video image displayed on the display monitor 120 is captured when the angle of view from the vehicle-mounted camera 130 is θ1. Moving the vehicle 10 backward in such a state increases the angle of view of the vehicle-mounted camera 130 for displaying the same range on the display monitor 120 (see FIGS. 12(*b*) and (*c*)). Conversely, if the angle of view is increased when the vehicle 10 is moved backward, the range displayed on the display monitor 120 remains unchanged. When the same range is captured from the rear of the vehicle 10 and displayed on the display monitor 120 in a situation where the vehicle 10 is moved backward, the driver feels that the vehicle 10 is moving while the area around the vehicle stays put. The angle of view of the vehicle-mounted camera 130 can be changed when an optical system capable of continuously varying the focal length (a so-called telephoto lens) is employed. However, the simplest method would be to capture a video image at a wide angle of view by using a wide-angle lens, extract a portion of the video image that is within a required angle of view, and display the extracted portion of the video image on the display monitor 120. The second embodiment uses the above principle for the purpose of displaying a video image in the road-surface-based mode, and generates a video image in the road-surface-based mode from a video image captured by the vehicle-mounted camera 130 by changing the angle of view of the vehicle-mounted camera 130 in coordination with the movement of the vehicle 10.

C-1. Modification of Second Embodiment

The second embodiment, which has been described above, changes the angle of view of a video image captured by the vehicle-mounted camera 130 to generate a video image in such a manner as to indicate that the vehicle 10 is moving while the area around the vehicle 10 stays put (see FIG. 11). In contrast, if the angle of view for extracting a portion of the video image captured by the vehicle-mounted camera 130 is changed in up-down direction, the extracted video image looks as if the vehicle-mounted camera 130 changes its shooting direction in up-down direction. Consequently, the display monitor 120 can display a video image in such a manner as to indicate that the vehicle-mounted camera 130 tilts downward for an overhead shot of the target (power feeder 20) as the vehicle 10 approaches the target (power feeder 20).

A modification of the second embodiment, which is described above, is shown in FIG. 13. A video image displayed in a process illustrated in FIG. 13 looks as if the vehicle-mounted camera 130 tilts downward for an overhead shot of the target (power feeder 20) as the target (power feeder 20) moves to a location beneath the vehicle 10. FIG. 14 illustrates how the angle of view for extracting a portion of the video image captured by the vehicle-mounted camera 130 is varied in up-down direction in order to display the video image in the above manner.

For example, FIG. 13(a) assumes that the display mode of the display monitor 120 is switched to the road-surface-based mode as the target (power feeder 20) is within the switching range 124. The video image shown in FIG. 13(a) is displayed by extracting a video image within an angle of view of θa, which is shown in FIG. 14(a), from the video image captured by the vehicle-mounted camera 130. An angle of view of θo, which is shown in FIG. 14(a), represents a true angle of view at which the video image is captured by the vehicle-mounted camera 130.

Subsequently, when the vehicle 10 approaches the target (power feeder 20), the display monitor 120 displays an image in which a hatched image of the vehicle 10 overlays the target (power feeder 20). This image is displayed by extracting an image within an angle of view of θb, which is shown in FIG. 14(b). As is obvious from a comparison between FIGS. 14(a) and (b), the range of the angle of view for image extraction moves downward as the vehicle 10 approaches the target (power feeder 20). Further, the size of the angle of view for image extraction decreases as the vehicle 10 approaches the target (power feeder 20). The reason is that when the vehicle 10 approaches the target (power feeder 20), the display range of the vehicle 10, which is displayed at the bottom of the screen of the display monitor 120, enlarges to narrow the display range of the image showing the area around the vehicle 10, as indicated in FIG. 13.

When the vehicle 10 approaches the target (power feeder 20) to position the power receiver 12 immediately above the power feeder 20, the display monitor 120 displays an image shown, for instance, in FIG. 13(c). This image is displayed by extracting an image within an angle of view of θc, which is shown in FIG. 14(c). The angle of view for image extraction in FIG. 14(c) is shifted further downward from the angle of view for image extraction in FIG. 14(b). When the angle of view for extracting an image from the angle of view of an image captured by the vehicle-mounted camera 130 is shifted downward as described above, the resulting image displayed on the display monitor 120 looks as if the vehicle-mounted camera 130 is tilted downward to change its shooting direction.

Figure 13:
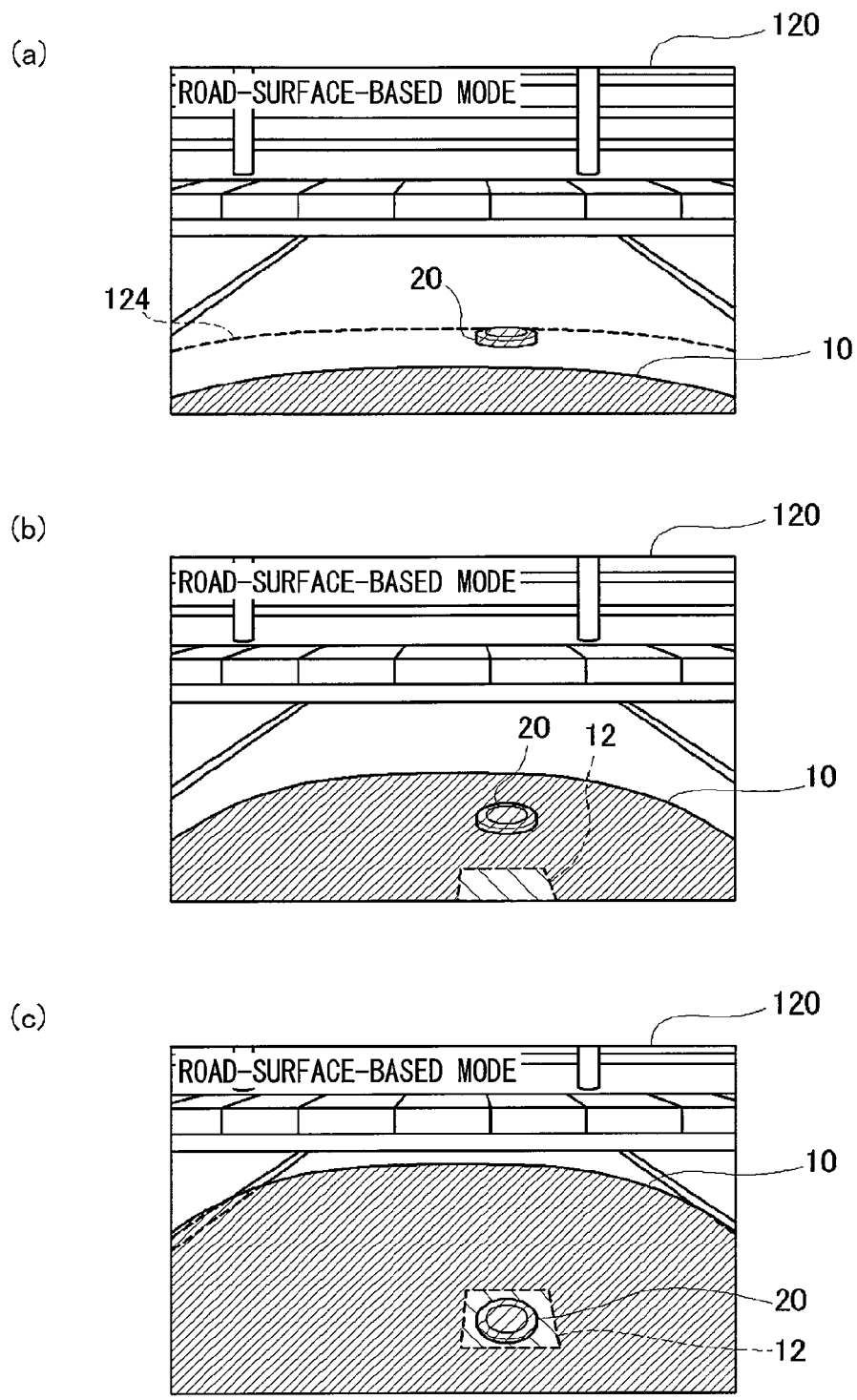
FIG. 13 is an explanatory diagram illustrating how the vehicle is positioned and stopped in a modification of the second embodiment while the vehicle periphery image is displayed in the road-surface-based mode.

In the modification of the second embodiment, which is shown in FIG. 13, the image of the target (power feeder 20) that is to be displayed on the display monitor 120 is changed to an image obtained as viewed from above (changed to an overheat shot) when the angle of view for image extraction is shifted downward. This makes it possible to display a more natural image.

D. Third Embodiment

The first embodiment, which has been described earlier, uses a top-view image as the video image for positioning the vehicle 10, and switches the display mode for the top-view image between the vehicle-based mode and the road-surface-based mode. The second embodiment, which has been described earlier, uses a video image captured by the rear vehicle-mounted camera 132 as the video image for positioning the vehicle 10, and switches the display mode for the video image captured by the vehicle-mounted camera 132 between the vehicle-based mode and the road-surface-based mode. Meanwhile, a third embodiment of the present disclosure performs switching between the top-view image and the image captured by the rear vehicle-mounted camera 132 depending on whether the display mode is the vehicle-based mode or the road-surface-based mode. For example, the third embodiment may use the image captured by the rear vehicle-mounted camera 132 when the vehicle-based mode is selected, and use the top-view image when the road-surface-based mode is selected. Conversely, the third embodiment may use the top-view image when the vehicle-based mode is selected, and use the image captured by the rear vehicle-mounted camera 132 when the road-surface-based mode is selected. The third embodiment will now be briefly described. The subsequent description of the third embodiment mainly deals with the difference from the first and second embodiments. Elements identical with those of the first and second embodiments are designated by the same reference numerals as those of their counterparts and will not be redundantly described in detail.

Figure 15:
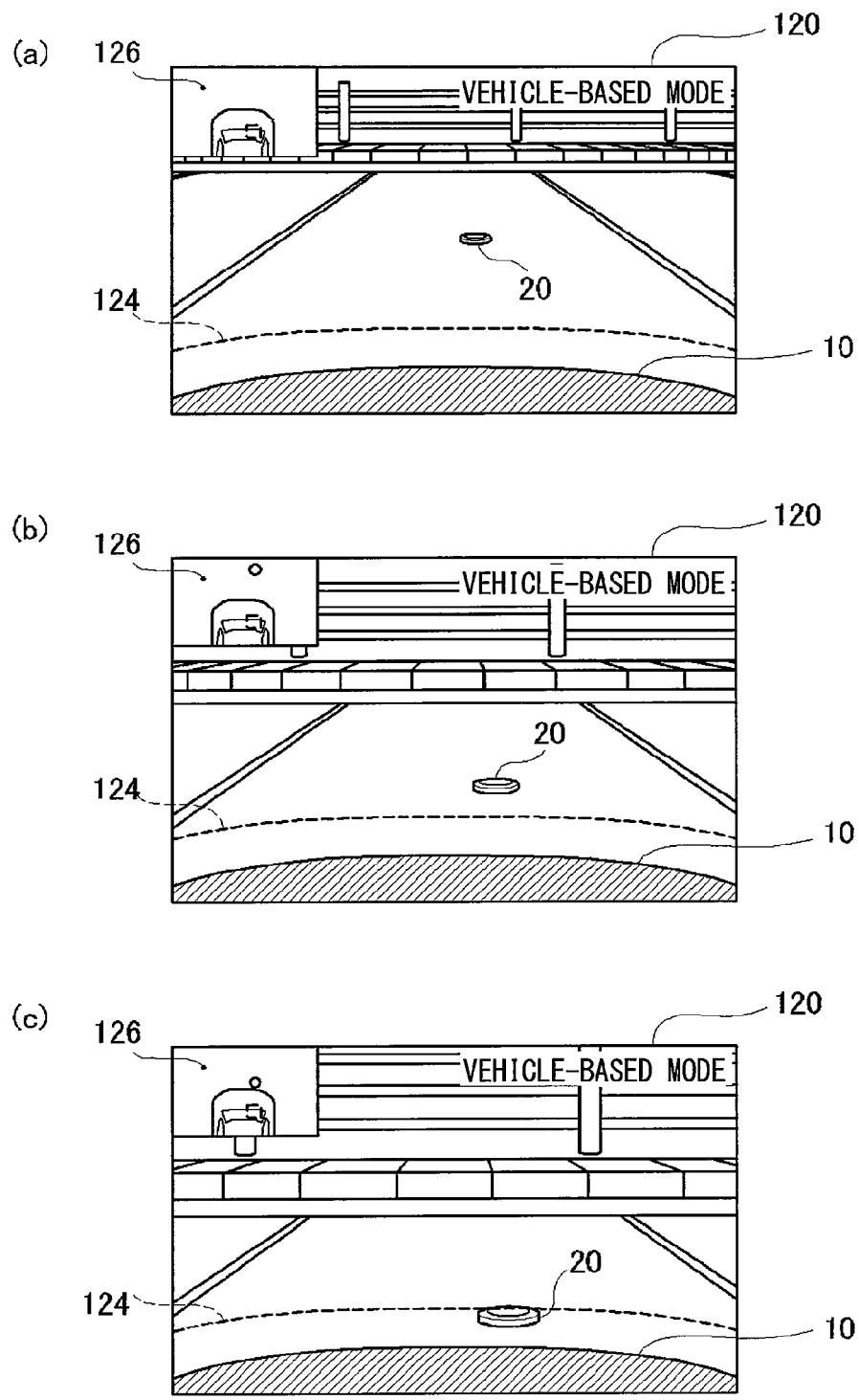
FIG. 15 is an explanatory diagram illustrating how the vehicle approaches a target in a third embodiment of the present disclosure while the vehicle periphery image is displayed in the vehicle-based mode.

FIG. 15 depicts the third embodiment and illustrate how the display monitor 120 displays a video image captured from the rear of the vehicle 10 by the vehicle-mounted camera 132 when the vehicle 10 approaches the target (power feeder 20). As shown in FIG. 15 (a) to (c), the display monitor 120 displays the video image captured by the vehicle-mounted camera 132 in the vehicle-based mode until the target (power feeder 20) enters the switching range 124. Further, in the example of FIG. 15, a small auxiliary screen 126 is displayed on the upper left corner of the display monitor 120. The auxiliary screen 126 shows a top-view image of the rear of the vehicle 10. The top-view image of the rear of the vehicle 10 is shown because it is assumed that the vehicle 10 is to be moved backward and positioned with respect to the target (power feeder 20) as described earlier with reference to FIG. 3. Therefore, when the vehicle 10 is to be moved forward and positioned with respect to the target (power feeder 20), the auxiliary screen 126 shows a top-view image of the front of the vehicle 10. The example of FIG. 15 assumes that the top-view image on the auxiliary screen 126 is shown in the vehicle-based mode, as is the case with an image displayed outside the auxiliary screen 126, that is, displayed in a main screen of the display monitor 120. Alternatively, the auxiliary screen 126 may display its content in a display mode different from the display mode of the main screen of the display monitor 120, that is, in the road-surface-based mode.

When the target (power feeder 20) enters the switching range 124 as illustrated in FIG. 15(c), the main screen of the display monitor 120 shows the top-view image of the rear of the vehicle 10 in the road-surface-based mode, and the auxiliary screen 126 shows the video image captured from the rear of the vehicle 10 by the vehicle-mounted camera 132. In this instance, the auxiliary screen 126 may display its content in the same road-surface-based mode as the main screen of the display monitor or in the vehicle-based mode.

Figure 16:
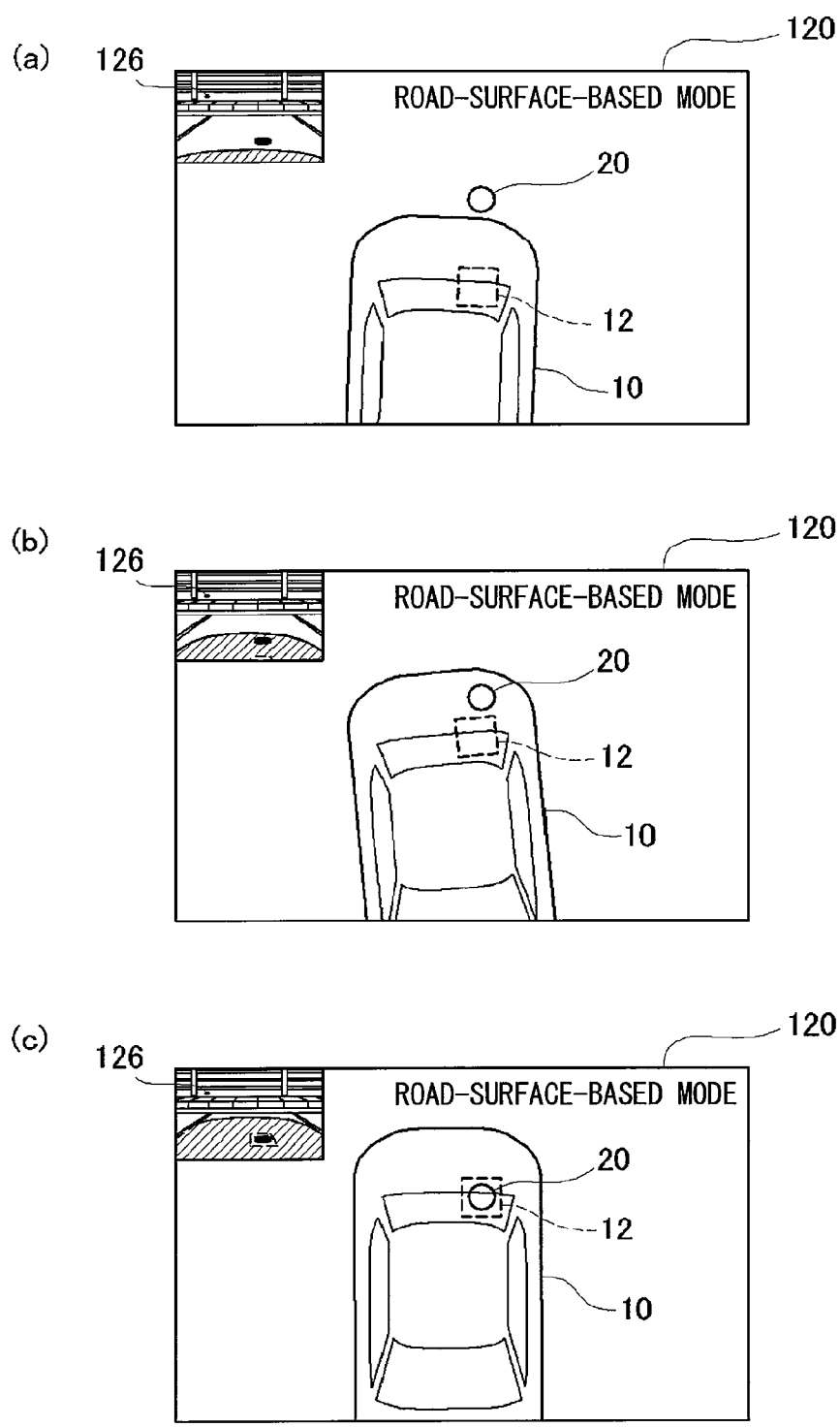
FIG. 16 is an explanatory diagram illustrating how the vehicle is positioned and stopped in the third embodiment while the vehicle periphery image is displayed in the road-surface-based mode.

FIG. 16 depicts the third embodiment and illustrate how the main screen of the display monitor 120 shows a top-view image of the rear of the vehicle 10 in the road-surface-based mode when the vehicle 10 approaches the target (power feeder 20). Further, the auxiliary screen 126 on the upper left corner of the display monitor 120 shows a video image captured from the rear of the vehicle 10 by the vehicle-mounted camera 132. When the target (power feeder 20) enters the switching range 124, the third embodiment switches the content displayed on the display monitor 120 from the video image captured from the rear of the vehicle as illustrated in FIG. 15 to the top-view image illustrated in FIG. 16. The display monitor 120 may thus open a screen to predict such a change in its content before actually changing its content.

Before the target (power feeder 20) enters the switching range 124, the third embodiment, which has been described above, causes at least the main screen of the display monitor 120 to show a video image in the vehicle-based mode. When the target (power feeder 20) enters the switching range 124, the third embodiment switches the display mode of the video image to the road-surface-based mode. Consequently, the driver can accurately position the power receiver 12 of the vehicle 10 with respect to the target (power feeder 20).

While various embodiments and their modifications have been described, the present disclosure is not limited to the above-described embodiments and modifications. Those skilled in the art will recognize that the present disclosure can be implemented by various other embodiments without departing from the spirit and scope of the appended claims. For example, the foregoing embodiments and modifications have been described on the assumption that the vehicle 10 is an electric vehicle, and that the power receiver 12 of the electric vehicle is to be positioned with respect to the power feeder 20 on a road surface. However, the vehicle 10 need not always be an electric vehicle, and the target for positioning may be other than the power feeder 20, such as a white line or wheel stop indicative of a position at which the vehicle is to be stopped.

Further, the foregoing embodiments and modifications have been described on the assumption that front-rear direction images of the vehicle 10 are captured by the vehicle-mounted cameras 130, 132, and that left-right direction images of the vehicle 10 are captured by the vehicle-mounted cameras 134, 136, and further that these images are combined to display a top-view image in order to show the entire area around the vehicle 10. Alternatively, the front-rear direction images of the vehicle 10, which are captured by the vehicle-mounted cameras 130, 132, may be used to display the top-view image that shows the entire area around the vehicle 10. More specifically, the images to be captured by the vehicle-mounted cameras 134, 136 (the left-right direction images as viewed from the vehicle 10) are already captured by a vehicle-mounted camera that captures an image in the direction of movement of the vehicle 10 (by the vehicle-mounted camera 130 when the vehicle 10 moves forward and by the vehicle-mounted camera 132 when the vehicle 10 moves backward). Thus, the top-view image showing the entire area around the vehicle 10 may be alternatively generated based on the converted images having undergone the coordinate conversion that is applied to the images (past images) already captured by the vehicle-mounted camera 130 or the vehicle-mounted camera 132, instead of being applied to the images captured by the vehicle-mounted cameras 134, 136.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A driving assistance apparatus that assists a driver of a vehicle in positioning the vehicle with respect to a target on a road surface before stopping the vehicle, the driving assistance apparatus comprising:
    a vehicle-mounted camera that captures a video image showing an area around the vehicle, the area including the target;
    an image generation section that generates a positioning video image to position the vehicle with respect to the target, based on the video image captured by the vehicle-mounted camera, even when the target is beneath the vehicle;
    a display monitor that displays the positioning video image; and
    an acquisition section that acquires a relative location of the target with respect to the vehicle, wherein
    the image generation section selectively generates the positioning video image in a first display mode or the positioning video image in a second display mode based on the relative location of the target,
        the first display mode being a display mode in which the target moves with respect to the vehicle,
        the second display mode being a display mode in which the vehicle moves with respect to the target,
    the image generation section generates the positioning video image by combining a vehicle outline image with the video image captured by the vehicle-mounted camera, the vehicle outline image being indicative of an outline of the vehicle, and
    the image generation section generates the positioning video image by combining a target image with the vehicle outline image, the target image being indicative of the location of the target, when the target is hidden from the vehicle-mounted camera by the vehicle.

2. The driving assistance apparatus according to claim 1, wherein:
    the image generation section generates the positioning video image by
        converting the video image captured by the vehicle-mounted camera to a video image representing an overhead shot of the vehicle and
        combining a vehicle outline image with the converted video image, the vehicle outline image being indicative of an outline of the vehicle.

3. The driving assistance apparatus according to claim 2, wherein
the image generation section generates the positioning video image by combining a target image with the vehicle outline image, the target image being indicative of the location of the target, when the target is located below the vehicle.

4. The driving assistance apparatus according to claim 1, wherein
the image generation section generates the positioning video image by combining a mark image with the vehicle outline image, the mark image being indicative of an in-vehicle positioning mark used to position the vehicle with respect to the target.

5. The driving assistance apparatus according to claim 1, wherein
the image generation section generates the positioning video image in the second display mode when the target is within a switching range predefined around the vehicle.

6. The driving assistance apparatus according to claim 1, wherein:
the vehicle includes
an electric motor that generates a driving force to run the vehicle,
a battery that supplies electric power to the electric motor, and
a power receiver that receives electric power that is stored in the battery, from an outside source separate from the vehicle, in a non-contact manner; and
the target is a power feeder that supplies electric power to the power receiver in a non-contact manner.

7. A driving assistance method that assists a driver of a vehicle in positioning the vehicle with respect to a target on a road surface before stopping the vehicle, the driving assistance method comprising:
capturing a video image showing an area around the vehicle, the area including the target;
acquiring a relative location of the target with respect to the vehicle;
selecting, as a display mode used when the video image showing the area around the vehicle is to be displayed in a display monitor, a selected display mode that is one of a first display mode and a second display mode, based on the relative location of the target,
the first display mode being a display mode in which the target moves with respect to the vehicle,
the second display mode being a display mode in which the vehicle moves with respect to the target;
generating a positioning video image by combining a vehicle outline image with the video image by combining a vehicle outline image with the video image captured by the vehicle-mounted camera, the vehicle outline image being indicative of an outline of the vehicle of an outline of the vehicle;
generating the positioning video image to position the vehicle with respect to the target even while the target is beneath the vehicle by combining a target image with the vehicle outline image, the target image being indicative of the location of the target, when the target is hidden from the vehicle-mounted camera by the vehicle; and
displaying, in the display monitor, the video image showing the area around the vehicle in the selected display mode.

8. The driving assistance apparatus according to claim 2, wherein
the image generation section generates the positioning video image by combining a mark image with the vehicle outline image, the mark image being indicative of an in-vehicle positioning mark used to position the vehicle with respect to the target.

* * * * *